United States Patent [19]

Hoogeboom

[11] 4,054,552

[45] Oct. 18, 1977

[54] THERMAL OXIDATIVELY STABLE POLYCARBONATE

[75] Inventor: Thomas J. Hoogeboom, Evansville, Ind.

[73] Assignee: General Electric Company, Pittsfield, Mass.

[21] Appl. No.: 272,332

[22] Filed: July 17, 1972

Related U.S. Application Data

[63] Continuation-in-part of Ser. No. 28,050, April 13, 1970, abandoned.

[51] Int. Cl.$^2$ .................... C08G 63/62; C08L 69/00
[52] U.S. Cl. ................ 260/47 XA; 260/18 PF; 260/45.8 A; 260/49
[58] Field of Search ................ 260/47 XA, 45.8 A

[56] References Cited

U.S. PATENT DOCUMENTS

| | | | |
|---|---|---|---|
| 3,378,523 | 4/1968 | Caldwell et al. | 260/47 XA |
| 3,489,716 | 1/1970 | Calkins | 260/45.8 A |
| 3,578,634 | 5/1971 | Bialous et al. | 260/47 XA |
| 3,634,312 | 1/1972 | Babillis | 260/47 XA |

Primary Examiner—Wilbert J. Briggs, Sr.
Attorney, Agent, or Firm—William F. Mufatti

[57] ABSTRACT

A thermal oxidatively stable polycarbonate composition stabilized with a minor amount of an ester of a phosphorodihalidous acid and to a process for preparing a thermal oxidatively stable polymer. In the process, the ester of a phosphorodihalidous acid is reacted with the bisphenol-A monomer. In addition, an epoxy may be used in admixture with the composition, which epoxy compound has the following formula:

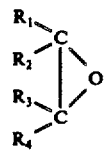

8 Claims, No Drawings

THERMAL OXIDATIVELY STABLE POLYCARBONATE

This Patent Application is a continuation-in-part of patent application Ser. No. 28,050 filed Apr. 13, 1970, now abandoned.

This invention relates to thermal oxidatively stable polycarbonate compositions and more particularly to polycarbonate compositions having minor amounts of particular phosphorus-containing compounds reacted in the polymer chain and to a process for preparing the thermal oxidatively stable polymers hereinafter described.

BACKGROUND OF THE INVENTION

While it is known to incorporate phosphorous into a polymer chain as disclosed in U.S. Pat. No. 3,378,523 and in the publication by G. S. Kolesnikov et al found in Vysokomol-soyed.A9; No. 10, pages 2246–2249, 1947, none of these references discloses the use of minor amounts of particular phosphorus-containing materials to be incorporated into the polymer chain to achieve greatly enhanced thermal stability. Due to the use of increased molding temperatures with polycarbonates and the exposure of molded polycarbonate shapes to higher use temperatures, it is increasingly more important to provide polycarbonates having increased stability to thermal degradation or discoloration due to elevated temperatures.

U.S. Pat. No. 3,378,523 discloses using large quantities of phosphorus-containing compounds and specifically in amounts of 0.2 to 0.5 mole of the phosphorus containing per mole of bisphenol-A. By employing amounts of 0.2 or 20 mole percent of the phosphorus compound of the instant invention, a non-commercial product is obtained.

In U.S. Pat. No. 3,634,312, is is known to prepare copolycarbonate phosphite by incorporating phosphorus in the polymer chain in the form of a phosphite. However, in such a polymer, the polymer make-up is a branched polymer having polymer chain building units in three directions or on three reactive points of the phosphite radical. This is specifically shown in the polymer formula of U.S. Pat. No. 3,634,312. Because of this structure, the polymer of U.S. Pat. No. 3,634,312 exhibits non-Newtonian flow characteristics.

DESCRIPTION OF THE INVENTION

It has been surprisingly discovered that by incorporating minor amounts of a particular phosphorus-containing material into the polymer chain, thermally stable polycarbonates are obtained.

More specifically, this invention is directed to reacting a dihydric phenol such as 2,2-bis(4-hydroxyphenyl) propane (hereinafter referred to as bisphenol-A), a carbonate precursor and a minor amount of an ester of a phosphorodihalidous acid as represented by the formula:

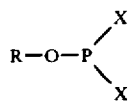

wherein X is a halogen atom independently selected from the group consisting of fluorine, chlorine, bromine and iodine and R is an organic radical of 1–15 carbon atoms and may be either aryl, haloaryl, alkyl, cycloalkyl, aralkyl or alkaryl. In addition, the above polymer may have in admixture therewith a particular epoxy compound.

The polymer of the instant application can be represented by the following formula:

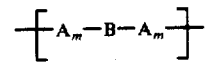

wherein A is

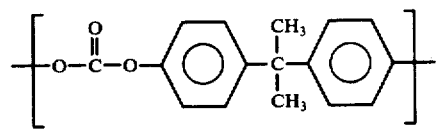

and wherein B is

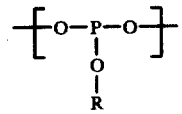

R is as defined previously and is a monofunctional organic group attached to one of the phosphite linkages and $m$ is about 5 to 10,000. Thus the polymer formed herein is not a branched polymer as is known in the polymer field, nor does it exhibit non-Newtonian flow. The polymer of the instant invention has Newtonian flow characteristics, is linear and has only two of the phosphite linkages as part of the polymer chain. Newtonian flow is defined as the type of flow occurring in a liquid system where the rate of shear is directly proportional to the shearing force.

PREFERRED EMBODIMENT OF THE INVENTION

The following examples are set forth to illustrate more clearly the principle and practice of this invention to those skilled in the art. Unless otherwise specified, where parts or percents are mentioned, they are parts or percents by weight.

EXAMPLE I

To a reactor fitted with a reflux condenser and mechanical agitator, charge 76 kg. of methylene chloride, 9.53 kg. of 2,2-bis(4-hydroxyphenyl) propane, 8.5 kg. of calcium hydroxide, 0.188 kg. of p-tertiary butylphenol and 4.7 ml. of triethylamine. The slurry is stirred and phosgene is added at a rate of about 6.0 kg. per hour. After 48 minutes, the phosgene addition is terminated. The polycarbonate in solid form is recovered by filtering and evaporation of the solvent. The polycarbonate is dried overnight at 125° C and then extruded at a temperature of about 525° F. The extrudate is comminuted into pellets.

The polycarbonate pellets are designated as A.

EXAMPLE II

To a reactor fitted with a reflux condenser and mechanical agitator, charge 76 kg. methylene chloride, 9.53 kg. of 2,2-bis(4-hydroxyphenyl) propane 8.5 kg. calcium hydroxide, 0.188 kg. of p-tertiary butylpheno, 4.7 ml. of triethylamine and 7.1 ml. of phenyl phosphorodichloridite. The slurry is stirred and phosgene is added at a rate of about 6.0 kg. per hour. After 43 minutes, the phosgene addition is terminated and the polycarbonate is recovered and pelletized as in Example I.

Elemental phosphorus content of the polycarbonate is determined by the Schoniger combustion test described in Identification and Analysis of Plastics by Haslum and Willis, Iliffe Books, London, 1965, page 8. Elemental phosphorus content is found to be 0.0086 weight percent.

The polycarbonate pellets are designated as B.

EXAMPLE III

Example II is repeated except that 28.4 ml. of phenyl phosphorodichloridite is used herein instead of 7.1 ml. thereof.

Elemental phosphorus is found to be 0.0185 weight percent.

The polycarbonate pellets are designated as C.

EXAMPLE IV

Each of the polycarbonate pellets of Examples I-III are molded into test samples at the temperatures so indicated in Table 1. Thermal stability to discoloration is measured using the IDL Color Eye Colorimeter in terms of APHA numbers (American Public Health Association). The results are as follows:

TABLE I

| SAMPLE | WT. % PHOSPHOROUS | APHA 550° F | APHA 600° F |
|---|---|---|---|
| A | 0 | 62 | 66 |
| B | 0.0086 | 23 | 23 |
| C | 0.0185 | 20 | 20 |

EXAMPLE V

Example IV is repeated except that 0.1% of 3,4-epoxycyclohexylmethyl 3,4-epoxycyclohexane carboxylate is blended with the polycarbonate pellets. B and C samples are molded at the temperatures so indicated in Table 2. The samples are heat aged for 7 days at 140° C. The samples are then measured for thermal stability to discoloration by the same test procedure employed in Example IV. The results are as follows:

TABLE 2

| SAMPLE | WT. % PHOSPHOROUS | HEAT AGED APHA 550° F | HEAT AGED APHA 600° F |
|---|---|---|---|
| A | 0 | 117 | 152 |
| B | 0.0086 | 37 | 41 |
| C | 0.0185 | 32 | 35 |

Example II is repeated except that 1230 ml. (20 mole %) of phenylphosphorodichloridite is employed herein instead of 7.1 ml. thereof.

The polycarbonate is determined to have an elemental phosphorus content of 1.87 weight percent.

The polycarbonate is dried overnight at 80° C in a forced draft hot air oven. Extensive degradation of the polymer occurs and upon attempting to extrude the polymer into pellets, a brown gummy mass results without the properties of a polymeric resin like polycarbonate.

The instant invention is directed to a thermally stable polymer composition and more particularly to a thermally stable polycarbonate having incorporated into the polymer structure elemental phosphorus in an amount of 0.0005 to about 1.0 weight percent based on the total weight of the polymer. The polymer herein set forth is the residue of the condensation reaction of bisphenol-A, a carbonate precursor and a minor amount of a reactant which is an ester of a phosphorodihalidous acid as represented by the formula:

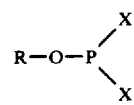

Wherein in the above formula, X is a halogen atom independently selected from the group consisting of fluorine, iodine, bromine, and chlorine and R is an organic radical of 1-15 carbon atoms and may be selected from the group consisting of aryl, haloaryl, alkyl, cycloalkyl, aralkyl and alkaryl radicals. The resulting polymer has the chemical configuration as set forth previously.

In addition, the instant invention is directed to an improved process for preparing the polycarbonates of this invention, which process consists of preparing the thermal oxidatively stable polymer by reacting bisphenol-A, a carbonate precursor and a minor amount of the ester of phosphorodihalidous acid in an organic medium, such as methylene chloride, and in the presence of a catalyst, a molecular weight regulator and an acid acceptor. The amount of the ester of a phosphorodihalidous acid to be reacted per mole of bisphenol-A is 0.000015 to about 0.05 mole thereof. Further, the invention is directed to admixing with the above polymer an epoxy composition as represented by the following formula:

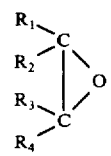

As stated previously, the ester of a phosphorodihalidous acid is represented by the above formula and R therein may be alkyl such as methyl, ethyl, n-propyl, isopropyl, n-butyl, sec-butyl, tertiary-butyl, n-amyl, isoamyl, tertiary amyl, n-hexyl, dodecyl, nonyl, etc.; cycloalkyl such as cyclohexyl, 2-methylcyclohexyl, 4-methylcyclohexyl, 2-ethylcyclohexyl, 4-ethylcyclohoxyl, 4-isopropylcyclohexyl, etc.; aryl such as phenyl, naphthyl, 1-naphthyl, 2-naphthyl, biphenyl, terphenyl, etc.; aralyky such as benzyl, phenylethyl, 2-phenylethyl, 1-phenylpropyl, 2-phenylpropyl, etc.; alkaryl such as p-tolyl, o-tolyl, 2,6-xylyl, p-cumyl, m-cumyl, o-cumyl, mesityl, p-tertiary butylphenyl, etc.; and haloaryl such as 2-chlorophenyl, 2,4,6 trichlorophenyl, 2,4,6 tribromophenyl, etc.

The epoxy compound employed herein may be represented by the above-described formula; namely,

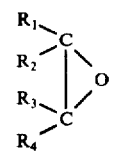

wherein $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms. While the actual number of hydrogen atom may vary, it should be a function of the volatility of the epoxy compound. The number of hydrogen atoms should be such as to minimize the propensity of the epoxy compound to volatize at a low temperature since its benefit in use with the polymer composition of this invention would otherwise be lost at the molding temperatures employed in preparing molded articles from the composition of this invention.

The amount of epoxy employed in the practice of this invention can vary from 0.01 to 1.0 weight percent based on the weight of the polymer composition and is preferably 0.03 to 0.50 weight percent. While more than 1.0 weight percent of epoxy can be employed, it has been found that higher amounts tend to degrade the physical properties of the copolycarbonate phosphite and thereby reduce the usefulness of the polymer in providing tough, flexible molded articles.

In the practice of this invention, other epoxy compounds that have been employed in place of the 3,4-epoxy-cyclohexylmethyl, 3,4 epoxycyclohexane carboxylate in the examples with essentially the same results are 3,4-epoxy-6-methylcyclohexylmethyl 3,4-epoxy-6-methylcyclohexane carboxylate, 2,3-epoxycyclohexylmethyl 3,4-epoxycyclohexane carboxylate 4-(3,4-epoxy-5-methyl cyclohexyl) butyl 3,4-epoxycyclohexane carboxylate, 3,4-epoxycyclohexyl ethylene oxide, di-3,4-epoxy-6-methylcyclohexylmethyl adipate, cyclohexyl methyl 3,4-epoxy-cyclohexane carboxylate 3,4-epoxy-6-methylcyclohexyl-methyl-6-methylcyclohexyl carboxylate, bisphenol-A diglycidyl ether, tetrabromobisphenol-A diglycidyl ether, diglycidyl ester of phthalic acid, diglycidyl ester of hexahydrophthalic acid, bis-epoxy dicyclopentadienyl ether of ethylene glycol, epoxidized soybean oil, bis-epoxycyclohexyl adipate, butadiene diepoxide, tetraphenylethylene epoxide, indene oxide, octyl epoxy tallate, cyclododecene epoxide and epoxidized polybutadiene. Preferably the epoxy compound employed in the practice of this invention is 3,4-epoxy cyclohexylmethyl 3,4-epoxycyclohexane carboxylate.

The dihydric phenols that can be employed herein to prepare the copolymer of this invention are bisphenols such as bis(4-hydroxyphenyl) methane, 2,2-bis(4-hydroxyphenyl) propane, 2,2-bis(4-hydroxy-3-methylphenyl) propane, 4,4-bis(4-hydroxyphenyl) heptane, 2,2-bis(4-hydroxy 3,5-dichlorophenyl) propane, 2,2-bis(4-hydroxy 3,5-dibromophenyl) propane, etc., dihydric phenol esters such as bis(4-hydroxyphenyl) ether, bis(3,5-dichloro-4-hydroxyphenyl) ether, etc.; dihydroxydiphenols such as p,p-dihydroxyphenyl, 3,3'-dichloro-4,4'-dihydroxydiphenyl, etc., dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis (4-hydroxyphenyl) sulfoxide, bis-(3,5-dibromo-4-hydroxyphenyl) sulfoxide, etc. A variety of additional dihydric phenols are also available to provide carbonate polymers and are disclosed in U.S. Pats. Nos. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) of glycols (bishaloformates of ethylene glycol, neopentyl glycol, polyetylene glycol, etc.). While other carbonate precursors will occur to those skilled in the art, carbonyl chloride, also known as phosgene is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can be either an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, paratertiarybutylphenol is employed as the molecular weight regulator.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A thermal oxidatively stable polymer composition which is the residue of the condensation reaction of bisphenol-A, a carbonate precursor and a minor amount of an ester of a phosphorodihalidous acid having the following formula:

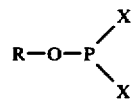

wherein X is a halogen atom independently selected from the group consisting of fluorine, chlorine, bromine and iodine and R is an organic radical selected from the group consisting of aryl, haloaryl, alkyl, cycloalkyl, aralkyl and alkaryl radicals of 1–115 carbon atoms, said minor amount of the ester of a phosphorodihalidous acid being sufficient to provide an elemental phosphorus content in the polymer of 0.0005 to about 1.0 weight percent based on the total weight of the polymer.

2. The composition of claim 1 wherein the ester of phosphorodihalidous acid is phenyl phosphorodichloridite.

3. In a process for preparing a thermal oxidatively stable polymer by reacting bisphenol-A with a carbonate precursor in the presence of an acid acceptor, a catalyst and a molecular weight regulator; the improvement which consists of reacting 0.000015 to about 0.05 mole per mole of bisphenol-A of an ester of a phosphorodihalidous acid having the following formula:

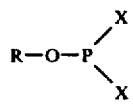

wherein X is a halogen atom independently selected from the group consisting of fluorine, chlorine, bromine and iodine and R is an organic radical selected from the group consisting of aryl, haloaryl, alkyl, aralkyl and alkaryl radicals of 1-15 carbon atoms.

4. The process of claim 3 wherein the additive is phenyl phosphorodichloridite.

5. The composition of claim 1 having in admixture therewith 0.01 to about 1.0 weight percent of an epoxy composition having the following formula:

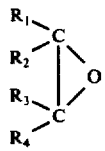

wherein $R_1$, $R_2$, $R_3$ and $R_4$ are independently selected from the group consisting of hydrogen, alkyl, cycloalkyl, substituted cycloalkyl, aryl, substituted aryl and heterocyclic radicals of 1-24 carbon atoms and mixtures thereof.

6. The composition of claim 5 wherein the epoxy compound is an epoxidized cycloaliphatic compound.

7. The composition of claim 5 wherein the epoxy compound is 3,4-epoxy-cyclohexylmethyl 3,4-epoxy cyclohexane carboxylate.

8. The composition of claim 1 wherein the polymer composition has the following formula:

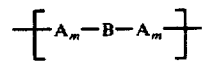

Wherein A is

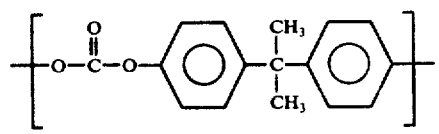

and wherein B is

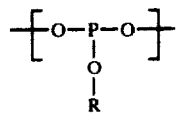

and $m$ is 5 to about 10,000 and R is as defined previously.

* * * * *